United States Patent [19]
Heartz et al.

[11] 3,769,442
[45] Oct. 30, 1973

[54] COMPRESSED DATA BASE FOR RADAR LAND MASS SIMULATOR

[75] Inventors: Robert A. Heartz, Deland, Fla.; Dan Cohen, Cambridge, Mass.

[73] Assignee: General Electric Company, New York, N.Y.

[22] Filed: Aug. 3, 1972

[21] Appl. No.: 277,778

[52] U.S. Cl. .............................. 35/10.4, 343/5 EM
[51] Int. Cl. .............................................. G09b 9/00
[58] Field of Search .................... 35/10.4; 343/5 EM

[56] References Cited
UNITED STATES PATENTS
3,131,247   4/1964   Benamy et al. ...................... 35/10.4
3,159,705   12/1964   Rhodes et al. ...................... 35/10.4
3,728,725   4/1973   Bauer ........................... 343/5 EM X Primary Examiner—Malcolm F. Hubler
Attorney—Allen E. Amgott et al.

[57] ABSTRACT

A process for producing a compressed data base for a radar land mass simulator which is descriptive of a selected land mass. Topographic maps or other data sources are used to determine prominent cultural features and terrain features such as ridge and valley lines. These features are identified by a string of contiguous straight line segments. The end points of each line segment can be identified in terms of their $x$, $y$, and $z$ coordinates relative to a chosen origin. Here, however, only the first point in a string is identified in the terms of full $x$, $y$, and $z$ coordinates, with each subsequent point identified in terms of the increment ($\Delta x$, $\Delta y$, and $\Delta z$) from the preceding point.

4 Claims, 4 Drawing Figures

COMPRESSED DATA BASE FOR RADAR LAND MASS SIMULATOR

BACKGROUND OF THE INVENTION

This invention relates generally to simulated radar displays and more particularly to a process for producing a compressed data base for such a display.

Airborne radars such as the plan position indicator (PPI) provide essential information for the navigation of an aircraft as well as for other purposes such as target identification. A degree of skill is required, however, to correctly interpret the information presented on the radar display. Rather than acquiring this skill through experience by observation of radar displays during aircraft flights over various terrains and under various weather conditions, systems have been developed to simulate actual radar returns on a radar display. Such a system is disclosed in U.S. Pat. No. 3,131,247 wherein phototransparencies representing the land mass elevation and other phototransparencies representing the radar reflectivity characteristics of selected areas are used with a flying spot scanner to produce a PPI representation. With such a system, as the "aircraft moves" to a position where its radar surveys an area outside that covered by one transparency, another transparency must be substituted. Also, if cultural changes such as new bridges, buildings, etc., occur, the transparencies must be modified to reflect the true return. The need for higher resolution than can be obtained with the use of transparencies represents another limitation on the use of this type of system.

The inherent limitations of the foregoing systems have led to a search for an improved approach. One approach involves reducing the terrain to digital words which describe the latitude, longitude, elevation and radar reflectivity of points at regular spaced intervals. The digital data base thus encoded is then used to produce a simulated radar return.

The number of data points contained in the data base using this straightforward approach depends upon the resolution required for the radar. The resolution of the radar in turn depends upon the number of resolution elements in each line or sweep, typically 1,000. If one hundred foot resolution is needed, every one hundred square foot interval will be a resolution element and must be encoded. Encoding the area covered by the 48 conterminous states would involve more than $10^{10}$ resolution elements. This not only represents a Herculean data management task, but also requires a tremendous storage capability. In addition, a PPI with one thousand resolution elements per sweep and four thousand sweeps per scan requires the handling of $4 \times 10^6$ resolution elements for each scan. Clearly, then, a brute force approach where every data element is processed is hopelessly uneconomical for a simulated real time PPI display. On the other hand, if resolution is sacrificed by using fewer resolution elements, the simulator will lose its realism.

A more economical approach has been described by R. A. Heartz and W. M. Bunker in a paper entitled "Radar Display Simulation for Training" which was presented on Apr. 2, 1971, at the Southeastern Section Meeting of the Analog/Hybrid Computer Educational Society. This approach basically involves the encoding of prominent features. These features are identified by the $x$, $y$, and $z$ coordinates of the end points of contiguous straight line segments defining the features. Although much data which is not essential to the production of a realistic display is thereby eliminated, identification of each line segment in this manner still requires a large storage.

SUMMARY OF THE INVENTION

In a preferred form of the invention, a topographic map describing the land mass to be encoded is used to select the features to be encoded. Ridge lines are identified as a string of contiguous straight line segments in terms of the end points of the segments. A start point, such as the beginning of a ridge line is identified fully in terms of its $x$, $y$, and $z$ coordinates. The next point, and each succeeding point in the string, need only be identified by its increments ($\Delta x$, $\Delta y$, and $\Delta z$) from the preceding point. Valley lines and significant slope changes are similarly encoded. Areas of different radar reflectivity are also encoded by lines together with the reflectivity to the right and the left of the lines.

The land mass as thus described can then be portrayed on a radar display through computation based on what an actual radar return would be at the supposed position.

DESCRIPTION OF THE PREFERRED EMBODIMENT

Figure 1:
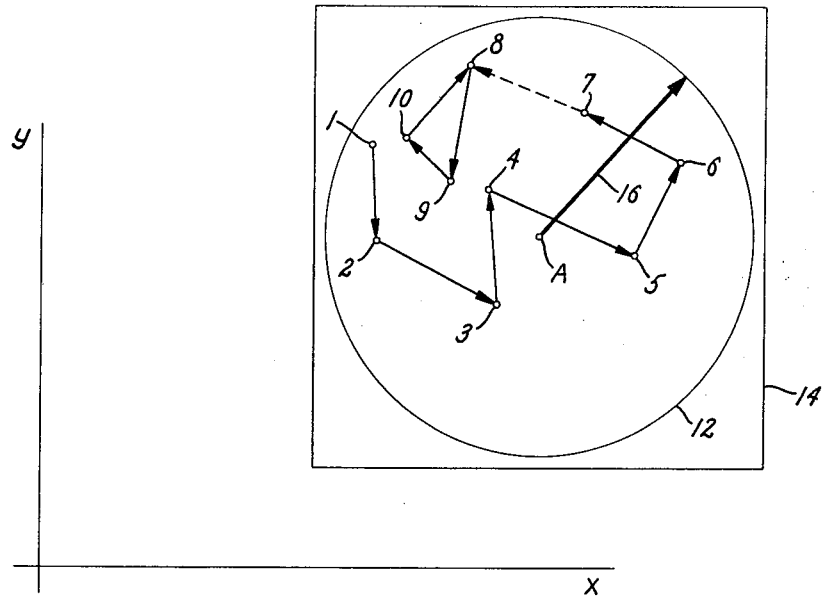
FIG. 1 shows a radar sweep on a pattern of lines descriptive of a land mass.

In accordance with the invention, a topographic map or other data source describing the region or land mass to be encoded is utilized to select features to be encoded. Ridge lines, which are a most significant terrain radar feature, are identified as a string of contiguous straight line segments in terms of the end points of the segments. To minimize the number of data points to be stored, a start point, such as the beginning of a ridge line, is selected. The line connecting the start point to the next point is then defined in terms of the next point. In a similar manner, the next line segment is identified by the subsequent end point. Moreover, as a means of minimizing the number of binary digits required to identify points, the start point only is identified fully in terms of its $x$, $y$, and $z$ coordinates. Start points are flagged and coded as two words in the data base. In the processing that follows, a start point takes two processing cycles with the results accumulated so that full accuracy is achieved without increasing data base word size or processing hardware. Subsequent points are identified in terms of increments ($\Delta x$, $\Delta y$, and $\Delta z$) from the preceding point. The $x$, $y$, and $z$ coordinates are relative to a chosen origin, which could be, for example, a particular latitude, longitude, and the elevation at that point.

In a similar manner, valley lines or significant slope changes are encoded. As these are of lesser radar significance, the error criteria can be relaxed so that better data compression is achieved. Areas of different radar reflectivity, such as water/land or land/city boundaries, are also encoded within selected error criteria by lines that define the boundaries and the reflectivity to the right and to the left of the lines.

In addition, certain discrete targets such as oil tanks, towers, ships, buildings, appear on the radar display as bright blobs. These blobs have few distinguishable features, but must be positioned accurately on the simulator radar display both with respect to terrain and each other. Cultural features such as these are encoded by their $\Delta x$, $\Delta y$, and $\Delta z$ coordinates, an intensity and a width. Long slender cultural features such as roads, dikes, small streams, etc., which are too narrow to be encoded by boundary lines, are encoded as target lines. These are encoded by the $\Delta x$, $\Delta y$, and $\Delta z$ of the end points, an intensity and a width. Complex cultural objects can be encoded by combinations of line and point source targets.

Thus, a compressed digital model that completely defines dimensions and radar reflectivity characteristics is developed and stored as a network of lines and point source targets. Some lines are flagged as imaginary lines. These are used where necessary to go from one feature to another and are subsequently bypassed in the processing.

The data base as thus encoded may then be placed in an appropriate storage medium such as magnetic tape or disk.

On a particular simulated flight or mission, the portion of the data base covering the terrain to be traversed is transferred from magnetic tape to a media such as a drum which will permit more rapid access. The pertinent data can easily be identified in terms of $x$ and $y$ coordinates.

Referring to FIG. 1, a string of line segments 1-10 is shown representing, say a ridge line. The ridge terminates at point 7 and is connected by an imaginary line to point 8. Points 8-10, 8 may define the top of a hill, for example.

Although not part of this invention, some description of how the data is utilized is desirable to demonstrate that compression is not achieved at the sacrifice of quality.

At any particular time the area surveyed by the scan of the radar will encompass only a small portion of the mission data on the drum. The scan area depends on the range setting of the radar and the simulated position of the aircraft. Referring again to FIG. 1, the scan area 12 of the radar of an aircraft at position A is shown. Although the scan area is circular, the data base for the particular scan is more conveniently taken as a square. In addition, scan square 14 may be made larger than the diameter of the scan to include data which will come into view because of movement of the aircraft during the scan. It should be understood that FIG. 1 is simplified in that a scan might typically include a thousand or more line segments, and overlapping data definition regions.

Since selecting the scan data involves sorting out a relatively small amount of data from the mass of mission data as much as 1.4 seconds might be required. Because of the aircraft movement the resulting display would indicate non-realtime data. To obviate this result the scan data can be selected based on the calculated aircraft position 1.5 seconds ahead of its present position, based upon its course and velocity.

Having selected the data to be included in a particular scan, a further selection can be made, if desired, to reduce the data to that contained in a segment of the scan. Each reduction of the data reduces the total number of computations which must be made in a given time period to process the data. For the purposes of this description, the reduction of data to that in a segment will not be made.

The next step is a determination of the particular line segments and discrete targets which will be intersected by the radar sweep to be generated. In FIG. 1, for example, sweep line 16 intersects line segments (4,5) and (6,7). One way to determine which line segments, contained within the scan, will be intersected is to compute the lengths of the normals from the end points of each line segment to the sweep line. If the algebraic length of the normals of both end points of the same line segment have the same sign, it indicates these points are both on the same side of the sweep and that no intersection has occurred. On the other hand, when the algebraic signs are different, the end points are on opposite sides of the sweep, and an intersection has occurred provided the range to the intersection is positive.

Figure 2:
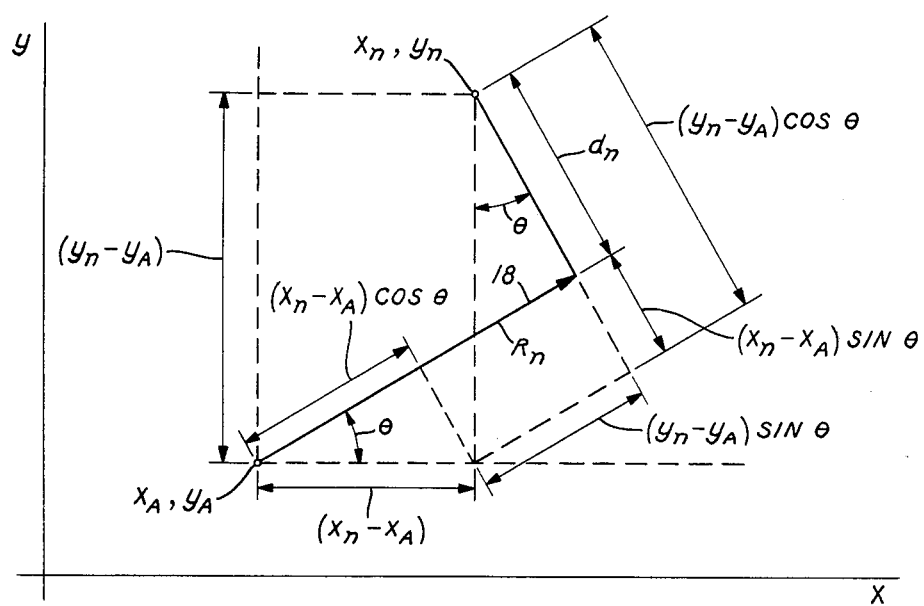
FIG. 2 illustrates the method of determining whether the radar sweep will intersect a particular line segment in the data base.

The geometry for this computation is shown in FIG. 2 for a particular point $(x_n, y_n)$. The normal distance $d_n$, between point $(x_n, y_n)$ and sweep 18, is:

$$d_n = (y_n - y_a) \cos \theta - (x_n - x_a) \sin \theta$$

When a determination has been made that an intersection exists it is necessary to identify its location. This can be done in terms of the distance or ground range of the intersection from the ground location of the aircraft.

From FIG. 2 also it is possible to determine the ground range, $R_n$, to the intersection of the sweep and the normal from the point $(x_n, y_n)$ to the sweep.

$$R_n = (x_n - x_a) \cos \theta + (y_n - y_a) \sin \theta$$

Figure 3:
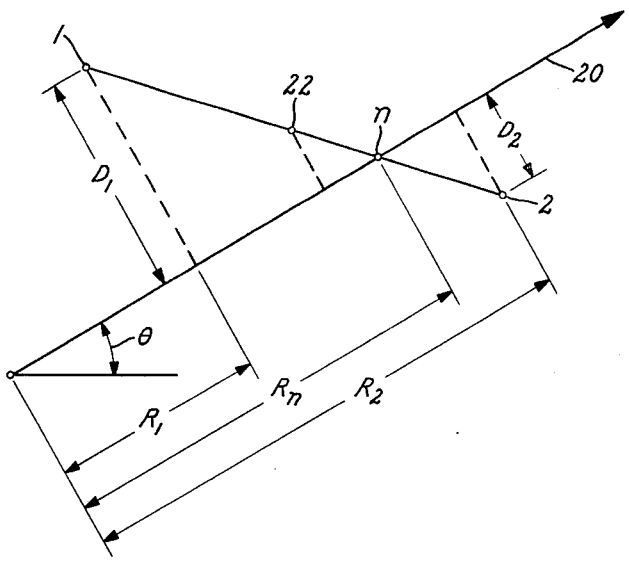
FIG. 3 illustrates the method of computing the point of intersection of the radar sweep and a line segment.

FIG. 3 illustrates the case of an intersection of sweep 20 with a line segment having end points 1 and 2. It will be assumed that point 1 is also the first point in a string. The normal distances $D_1$ and $D_2$ from the points to the sweep are computed as are the ranges $R_1$ and $R_2$. Using the normal distances $D_1$ and $D_2$, it is possible to determine the intersection location through an iterative process. The values of $D_1$ and $D_2$, including their signs, are added, and the sum divided by two. In FIG. 3, the first iteration will yield a new point 22. Since the normal distance for point 22 has the same sign as point 1, point 1 is now discarded, and the next iteration is made using points 22 and 2. Eventually point $n$ is reached with D equal to zero (to the desired degree of accuracy). Associated with point $n$ will be a particular elevation which could be obtained by a separate interpolation between the known elevations of points 1 and 2. An interpolater has been devised, however, which duplicates the manipulations performed with respect to the D values, so as to provide simultaneously the value of the range, $R_n$ and the elevation, $Z_n$.

Figure 4:
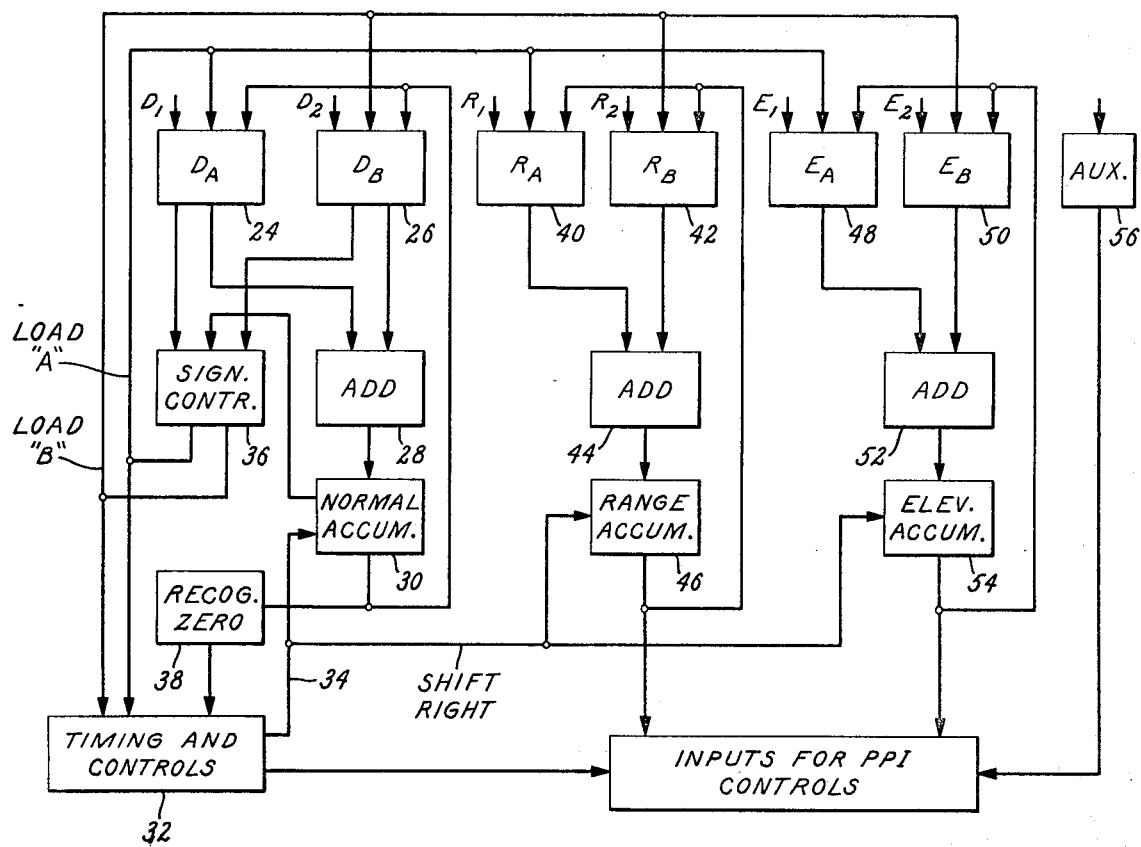
FIG. 4 is a block diagram of circuitry which may be used to carry out the computations.

Referring to FIG. 4, the distance values $D_1$ and $D_2$ which have been calculated are loaded into distance registers 24 and 26 respectively. The letter designations A and B on these registers merely indicate that the information pertaining to the first point of a line segment will be put in the A registers, while information relating to the second point will be put in the B registers. The algebraic sum of $D_1$ and $D_2$ is produced in adder 28, and transferred to normal accumulator 30. Timing and controls circuit 32 then delivers a shift right signal over line 34 which moves the amount in normal accumulator 30 one place to the right, thereby effecting the division by two. The signs of $D_1$ and $D_2$ are also loaded into registers 24 and 26, and are delivered to sign control circuit 36. The sign of the quotient in normal acculator 30 is also delivered sign control circuit 36 and enables one of the two outputs. If the quotient sign is the same as the sign of $D_1$, a receive signal (LOAD A) is delivered to distance register 24 which will then receive the quotient from normal accumulator 30. If the quotient sign agrees with that of $D_2$, a receive signal (LOAD B) is delivered to distance register 26.

Depending upon whether a LOAD A or LOAD B signal has been produced, one of the distance registers 24 and 26 will be loaded with a new normal distance (the normal distance to the sweep from what was the midpoint between the two original points). The process previously described is then repeated. Repetition is continued until the quotient in normal accumulator 30 becomes zero. Since each division is performed by a shift right, the size of normal accumulator 30 limits the number of iterations to reach zero. A normal distance of zero, of course, represents the point on the sweep where it intersects the line segment between the two original points. Recognize zero circuit 38 receives the outputs of normal accumulator 30, and upon receipt of a zero, signals timing and controls circuit 32. The normal distances for the end points of the next line segment determined to intersect with the sweep would then be loaded into distance registers 24 and 26.

At the same time the computations relating to the normal distances are being performed, parallel processing of range and elevation data of the same point is carried out. It will be recalled in connection with FIG. 2, that the ground range, $R_n$, to the intersection of the sweep with the normal to the sweep from a point can be calculated. In FIG. 4, the ranges $R_1$ and $R_2$ to the intersections of the sweep with the normals $D_1$ and $D_2$ are loaded into range registers 40 and 42. Their sum is taken in adder 44 and delivered to range accumulator 46. The shift right signal delivered by timing and controls circuit 32 over line 34 is also received by range accumulator 46 causing a division by two. The receive signal (LOAD A or LOAD B) prepared either range register 40 or 42 to load the average range contained in range accumulator 46. This range is the distance to the intersection of the sweep with the normal to the sweep from the midpoint of the line segment between the two original points.

As with the normal distance computations, the ground range computations are performed in an iterative manner until the range to the intersection of the sweep and the line segment between the two original points is contained in range accumulator 46.

In addition to the ground range to the intersection of the sweep and the line segment, the elevation at the intersection is also required. The elevations of the end points of the line segment are contained in memory. These are loaded into elevation registers 48 and 50, and summed in adder 52. The sum is contained in elevation accumulator 54 until the shift right signal delivered over line 34 causes the division by two. As was the case with the distance and range results, the quantity contained in elevation accumulator 54 will be entered into either elevation register 48 or 50, depending upon whether a LOAD A or a LOAD B signal has been produced by sign control circuit 36.

The process is iterated in parallel with the distance and range processing so that at the time the distance becomes zero, the interpolated elevation of the intersection is contained in elevation accumulator 54.

Line targets are handled in a similar fashion, except only the range, size, and intensity are required when it has been determined that the sweep will intersect the target.

Discrete point targets do not require the interpolation routine described in the preceding paragraphs. A discrete target intersects the sweep when its computed distance from the sweep ($d_n$) is less than the computed range ($R_n$) times $\Delta\theta$ where $\Delta\theta$ is the angle between sweeps.

The elevation and reflectivity or intensity information of an intersection is then read into a digital memory using computed range as the address. This is the sweep elevation and reflectivity profile which corresponds to the flying spot scanner data as read from the transparency system described in U.S. Pat. No. 3,131,247.

What is claimed is:

1. A process for producing a compressed data base for a radar land mass simulator, descriptive of a selected land mass relative to a chosen origin comprising:
   identifying land mass features desired to be displayed by a string of contiguous straight line segments in terms of the end points of the segments;
   selecting a start point for each string of contiguous straight line segments;
   recording the $x$, $y$, and $z$ coordinates of each start point relative to the origin; and
   recording the $\Delta x$, $\Delta y$, and $\Delta z$ of each subsequent point from the preceding point.

2. A process in accordance with claim 1 further including:
   recording with the $\Delta x$, $\Delta y$, and $\Delta z$ of each subsequent point the radar reflectivity codes to the right and left of the line connecting the point to the preceding point.

3. A process in accordance with claim 1 further including:
   recording the $\Delta x$, $\Delta y$, and $\Delta z$ of discrete radar targets as points in said strings of contiguous line segments.

4. A process in accordance with claim 3 further including:
   recording with the $\Delta x$, $\Delta y$, and $\Delta z$ of each discrete radar target its size and intensity.

* * * * *